United States Patent [19]
Glezer et al.

[11] Patent Number: 5,697,208
[45] Date of Patent: Dec. 16, 1997

[54] TURBINE COOLING CYCLE

[75] Inventors: Boris Glezer, DelMar; Eli H. Razinsky; Gerald D. Stringham, both of San Diego, all of Calif.

[73] Assignee: Solar Turbines Incorporated, San Diego, Calif.

[21] Appl. No.: 460,293

[22] Filed: Jun. 2, 1995

[51] Int. Cl.[6] ............................................. F02C 7/12
[52] U.S. Cl. .................................. 60/39.07; 60/39.75
[58] Field of Search ............................ 60/39.07, 39.75, 60/39.83, 226.1, 262, 266, 267

[56] References Cited

U.S. PATENT DOCUMENTS

| | | | |
|---|---|---|---|
| 3,418,808 | 12/1968 | Rich | 60/226.1 |
| 3,651,645 | 3/1972 | Grieb | 60/262 |
| 5,163,285 | 11/1992 | Mazeaud et al. | 60/39.07 |
| 5,269,133 | 12/1993 | Wallace | 60/39.83 |

FOREIGN PATENT DOCUMENTS 1388347  6/1972  United Kingdom ............. F02C 7/00

*Primary Examiner*—Louis J. Casaregola
*Attorney, Agent, or Firm*—Larry G. Cain

[57] ABSTRACT

Air flow delivery systems for gas turbine engines are used to increase component life and increase power and efficiencies. The present system increases the component life and increases efficiencies by directing a portion of a compressed air formed by the compressor section and located in a first fluid flow path to a second fluid flow path including a heat exchanger positioned operatively within the second flow path. The second fluid flow path results in a flow of cooled cooling air to be directed to the components of the gas turbine engine to be cooled. Thus, the components of the gas turbine engine are more efficiently cooled with a smaller quantity of air drawn from the compressor section generated air than if compressor generated air was used for cooling components of the gas turbine engine. Furthermore, more compressor generated air remains for combustion within the combustor section of the gas turbine engine.

22 Claims, 6 Drawing Sheets

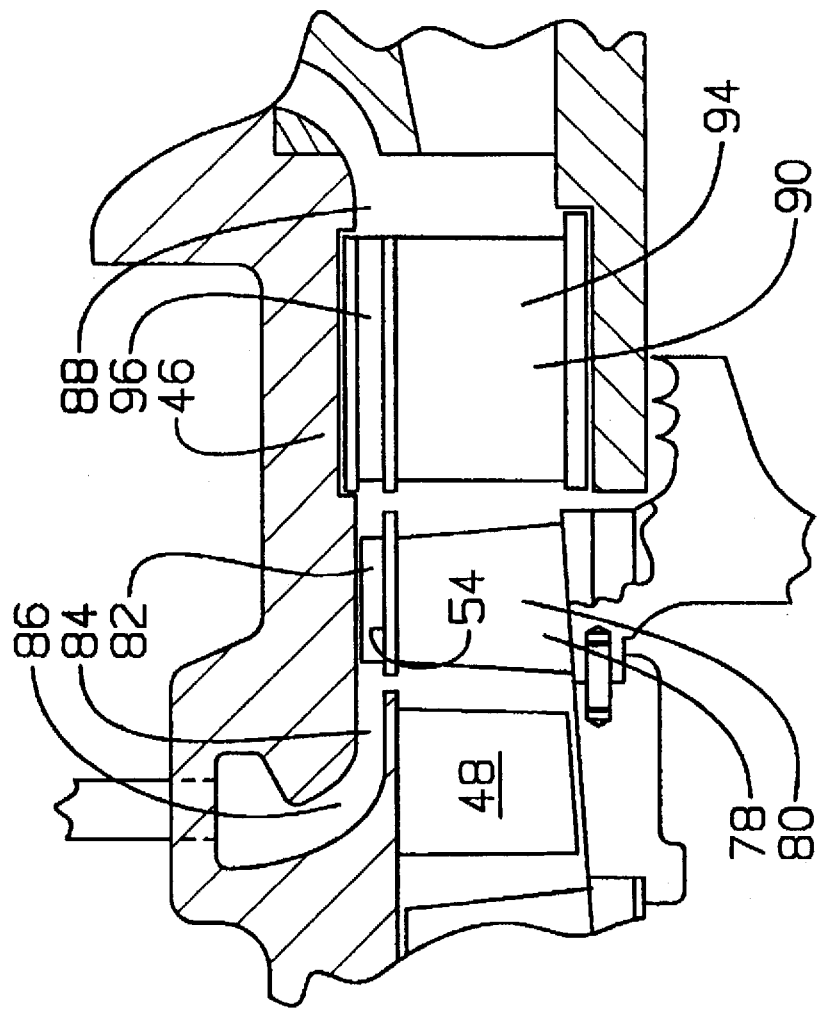

TURBINE COOLING CYCLE

TECHNICAL FIELD

This invention relates generally to gas turbine engines and more particularly to an improved cooling system for use with the gas turbine engines.

BACKGROUND ART

High performance gas turbine engines require increased firing temperatures and increased compressor pressures. Coolant from the compressor section is directed through cooling passages and cooling is used to ensure reliability and cycle life of individual components within the engine. For example, to improve fuel economy characteristics engines are being operated at higher temperatures than the material physical property limits of which the engine components are constructed. These higher temperatures, if not compensated for, oxidize engine components and decrease component life. Cooling passages are used to direct a flow of air to such engine components to reduce the high temperature of the components and prolong component life by limiting the temperature to a level which is consistent with material properties of such components.

Conventionally, a portion of the compressed air is bled from the engine compressor section to cool these components. Thus, the amount of air bled from the compressor section is usually limited to insure that the main portion of the air remains for engine combustion to perform useful work.

The operating temperatures of engines and the compressor pressure ratio are increased, to increase efficiency and power. The cooling air bled from such compressors of higher pressure ratio engines has an increased temperature due to work of compression. For example, in some applications the temperature is in excess of 1100 degrees Fahrenheit. The high temperature of the cooling air reduces cooling effectiveness, and requires a significantly larger amount of cooling air to keep the temperature of metallic components below a design limit. More cooling air is required to cool critical components resulting in less compressor air for combustion which reduces engine efficiency. Thus, a system is needed to reduce the amount of cooling air bled from the compressor and improve engine efficiency or better utilization of the cooling air is required.

The present invention is directed to overcome one or more of the problems as set forth above.

DISCLOSURE OF THE INVENTION

In one aspect of the present invention, an air flow delivery system is provided for a combustion fluid and for a cooling fluid used to cool components of a gas turbine engine. The engine has a compressor section and the air flow delivery system is comprised of a first fluid flow path interconnecting the compressor section with the combustor section. The compressor section includes a plurality of blades having a first blade portion causing a fluid flow within the first fluid flow path when the compressor section is in operation. And, a second fluid flow path interconnecting the first fluid flow path with the components of the gas turbine engine to be cooled. The second fluid flow path includes a heat exchanger interposed the first fluid flow path and the components to be cooled. The second fluid flow path has a flow of cooling air therein being formed by the operation of a second blade portion being formed on the plurality of blades.

In another aspect of the invention, an air flow delivery system is used with a gas turbine engine. The gas turbine engine includes a compressor section having a plurality of stages each having a disc in which a plurality of blades are attached thereto, and a combustor section and a turbine section positioned in operative relationship therewith. The air flow delivery system is comprised of a portion of the plurality of blades defining a two-stage configuration including a first blade portion being spaced from a second blade portion by a ring segment. A first fluid flow path includes a passage in which the first blade portion is positioned, and the first fluid flow path is in fluid flow communication with the turbine section. A second fluid flow path including a gallery in which the second blade portion is positioned, the gallery being in fluid communication with the first fluid flow path. A fluid flow being created within the first fluid flow path by the first blade portion during operation of the compressor section. The flow being generally used to provide a flow of fluid to the combustor section. A flow of cooling fluid being created within the second fluid flow path by the second blade portion during operation of the compressor section. The flow being generally used to provide a flow of cooling fluid to cool components of the gas turbine engine.

BRIEF DESCRIPTION OF THE DRAWINGS

FIG. 6 is an enlarged sectional view of a portion of a gas turbine engine as taken within line 6 of FIG. 1.

BEST MODE FOR CARRYING OUT THE INVENTION

Figure 1:
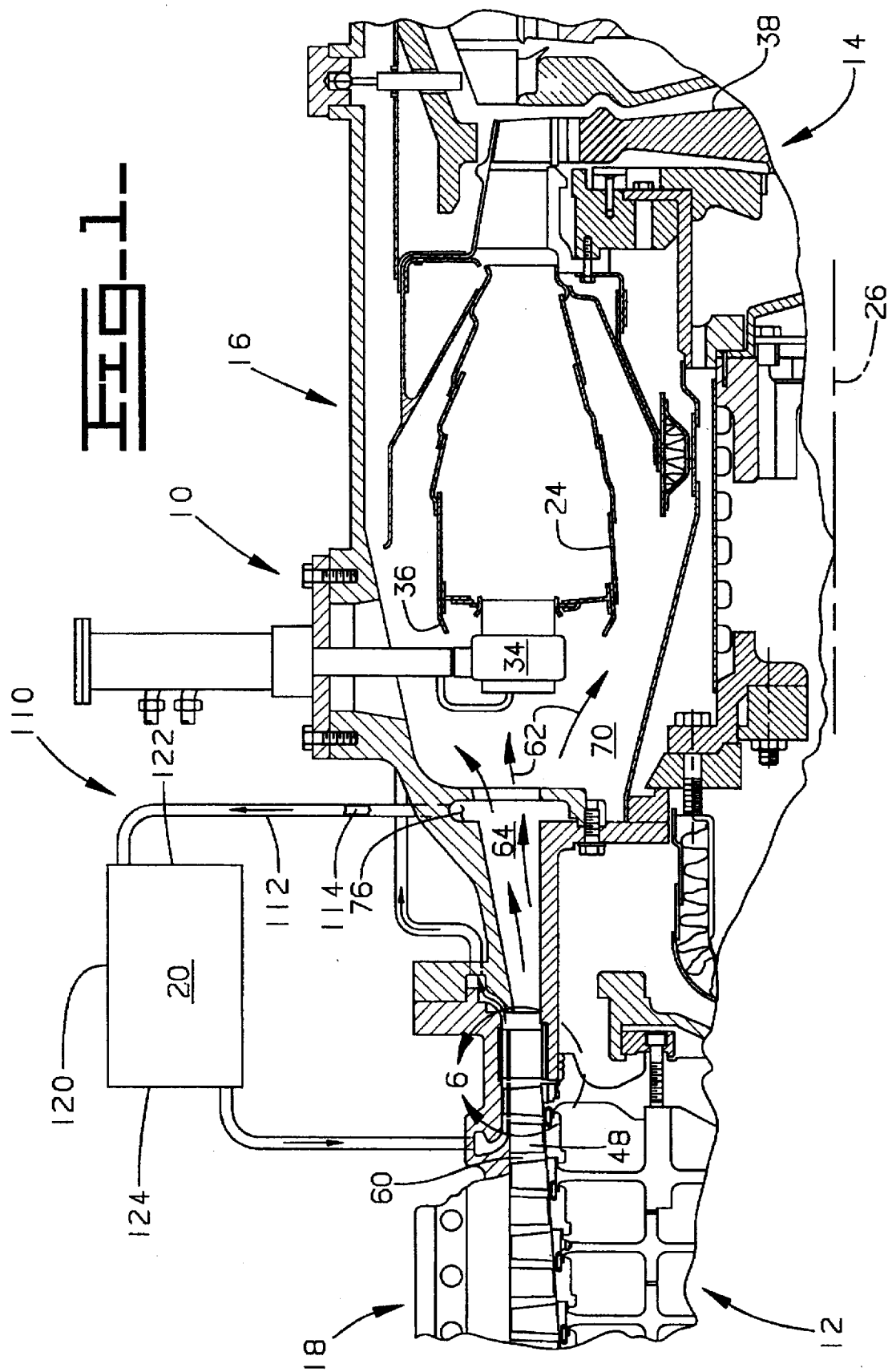
FIG. 1 is a partially sectioned partial view of a gas turbine engine embodying the present invention.
Figure 2:
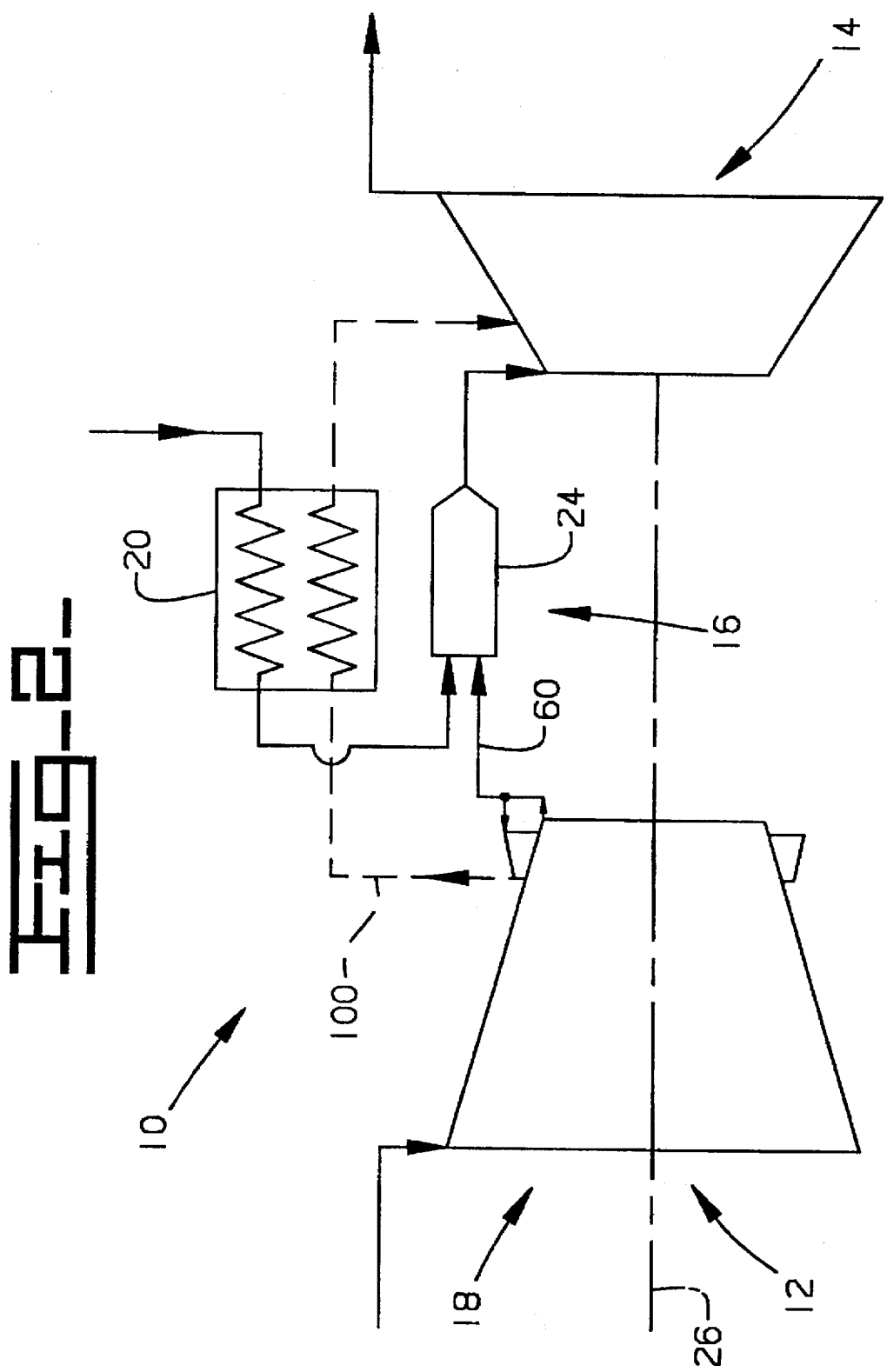
FIG. 2 is a generally schematically side view of a portion of a gas turbine engine embodying the present invention.

Referring to FIG. 1 and 2, a gas turbine engine 10 is shown but not in its entirety. The gas turbine engine 10 includes an air flow delivery system 12 for providing combustion air and for providing cooling air for cooling components of the engine 10. The engine 10 includes a turbine section 14, a combustor section 16, a compressor section 18 and a heat exchanger 20. The combustor section 16 and the compressor section 18 are operatively connected to the turbine section 14. In this application the combustor section 18 includes an annular combustion chamber 24 being positioned about a central axis 26 of the gas turbine engine 10. The annular combustion chamber 24 is operative positioned between the compressor section 18 and the turbine section 14. A plurality of fuel nozzles 34 (one shown) are positioned in an inlet end 36 of the annular combustion chamber 24. The turbine section 14 includes a first stage turbine 38 being centered about the central axis 26.

Figure 3:
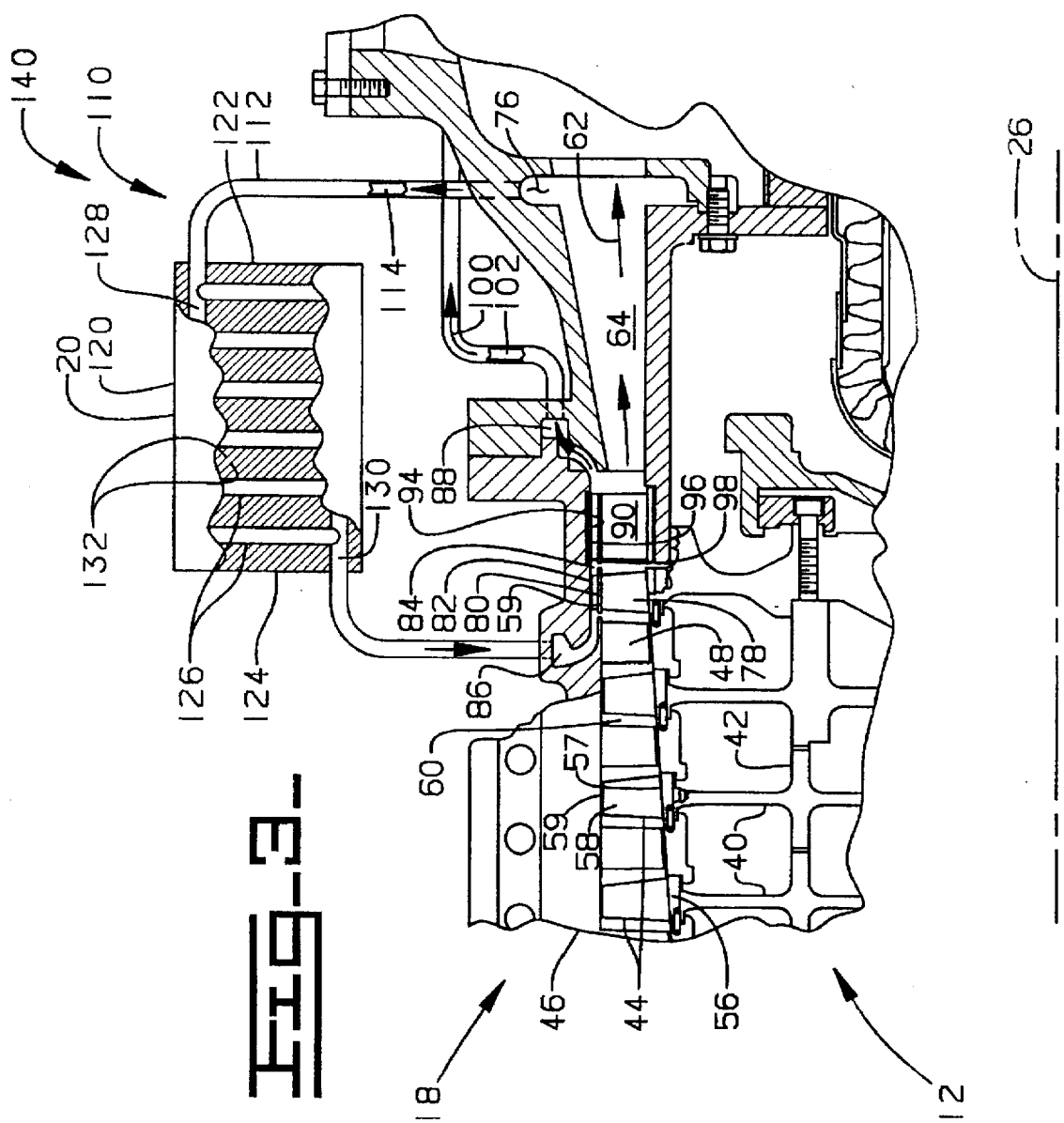
FIG. 3 is an enlarged sectional view of a portion of the gas turbine engine embodying the invention.

As best shown in FIGS. 3 and 6, the compressor section 18, in this application, is a multistage axial compressor having a plurality of stages 40 of which only a portion thereof are shown. The plurality of stages 40 within the compressor section 18 each rotate about the central axis 26 and include a central disc 42 having a plurality of blades 44 attached thereto. The plurality of blades 44 are rotatably positioned within a housing 46. Positioned on each side of the rotatable blade 44 is a stator assembly 48. A relationship between the rotating blades 44 nd the stator assembly 48 forms a generally sealed interface. The stator assembly 48 includes a plurality of blade segments 50 including an inner ring segment 51 being spaced from an outer ring segment 52 by a plurality of blades 54. Each of the blades 44 includes a root portion 56 being disposed within the disc 42, a platform portion 57 projecting radial therefrom and a first blade portion 58 extending radial from the platform portion 57. An outer tip 59 is defined on the first blade portion 58. A passage 60 is formed between the housing 46 and the platform portion 57 of the blades 44. The first blade portion 58 is positioned in the passage 60 and the outer tip 59 is in close rotational relationship to the housing 46. In operation the plurality of blades 44 define a flow of compressed air, designated by the arrows 62, as best shown in FIG. 1.

The air flow delivery system 12 has a first fluid flow path 64 interconnecting the passage 60 of the compressor section 18 with the turbine section 14. During operation, a fluid flow, designated by the arrows 62, is available in the first fluid flow path 64. The first fluid flow path 64 further includes an internal passage 70 positioned within the gas turbine engine 10. The flow of compressed fluid 62 is directed therethrough from the compressor section 18 to the combustor section 16 wherein a portion of the compressed fluid, air, is used for mixing with a combustible fuel, not shown, combusted and the resultant being used to drive the turbine 38 of the turbine section 14.

The air flow delivery system 12 further includes a second fluid flow path 76. The system 12 includes a portion of the plurality of blades 44 including a two-story compressor blade 78, as best shown in FIGS. 3 and 6. Each of the two-story compressor blades 78 includes a ring segment 80 being attached to the outer tip 59 and a second blade portion 82 extending radially from the ring segment 80. In this application, only one of the blades 44 attached to disc 40 of an individual stage 42 includes the two-story compressor blade 78 configuration. In the assembled position each of the ring segments 80 of each of the two-story compressor blade 78 generally forms a ring 83 which is in generally sealed relationship with the outer ring segment 52 of the stator assembly 48. The second blade portion 82 extends into a gallery or passage 84 formed between the ring 83 and the housing 46. The gallery 84 includes an inlet end portion 86 and an outlet end portion 88. A plurality of stator or diffuser blades 90 are positioned in the gallery 84 downstream of the two-story compressor blade 78. In this application, the plurality of stator blades 90 are formed as a part of the conventional stator assembly 48. For example, each of the stator blades 90 are attached to the outer ring segment 52 by a root portion 94 and has a first reaction portion 96 extending therefrom which is positioned in the gallery 84. An outer ring 98 is attached to the first reaction portion 96 and is generally sealingly attached to the housing 46 in a conventional manner.

The two-story compressor blade 78 rotates about the axis 26 and the second blade portion 82 is in close proximity to the housing 46. A flow of cooling air is formed by the operation of the second blade portion 82 and is designated by the arrow 100. The flow of cooling air 100 exits the outlet end portion 88 of the gallery 84 and is communicated to the turbine section 14 by way of a cooling gallery 102 of conventional construction, such as a single or plurality of internal passages or a single or plurality of tubes and or hoses.

A portion of the flow of compressed air 62 is communicated to the heat exchanger 20 by way of a ducting system 110 which, in this application, includes a tube 112 having a first end attached to the housing 46 and a second end attached to the heat exchanger 20. The tube 112 has a passage 114 formed therein which is in communication with the first fluid flow path 64 having the compressed air 62 therein. The passage 114 within the tube 112 is further in communication with the heat exchanger 20. For example, in this application, the heat exchanger 20 includes a housing 120 having a first or inlet end 122 and a second or outlet end 124. Positioned within the housing 120 is a plurality of cooling tubes 126. The plurality of cooling tubes 126 have a common inlet 128 extending externally through the first end 122 and a common outlet 130 extending externally through the second end 124. The plurality of cooling tubes 126 have fins 132 attached thereto for conduction heat away from the compressed fluid 62 and being absorbed in an external coolant, which conventionally passes through the heat exchanger 20. The compressed fluid 62 enters the inlet end 122 by way of the tube 112, gives up heat to the cooling tubes 126 which are in contact with the fins 132, dissipates heat thereto and exits the outlet end 124 as a cooler compressed fluid 62. The cooled compressed fluid 62 is communicated to the inlet end 86 of the gallery 84, comes into contact with the second blade portion 82 of the two-story blade 78 is accelerated and takes the form of the cooling air flow 100. Thus, the second fluid flow path 76 is completed.

Figure 4:
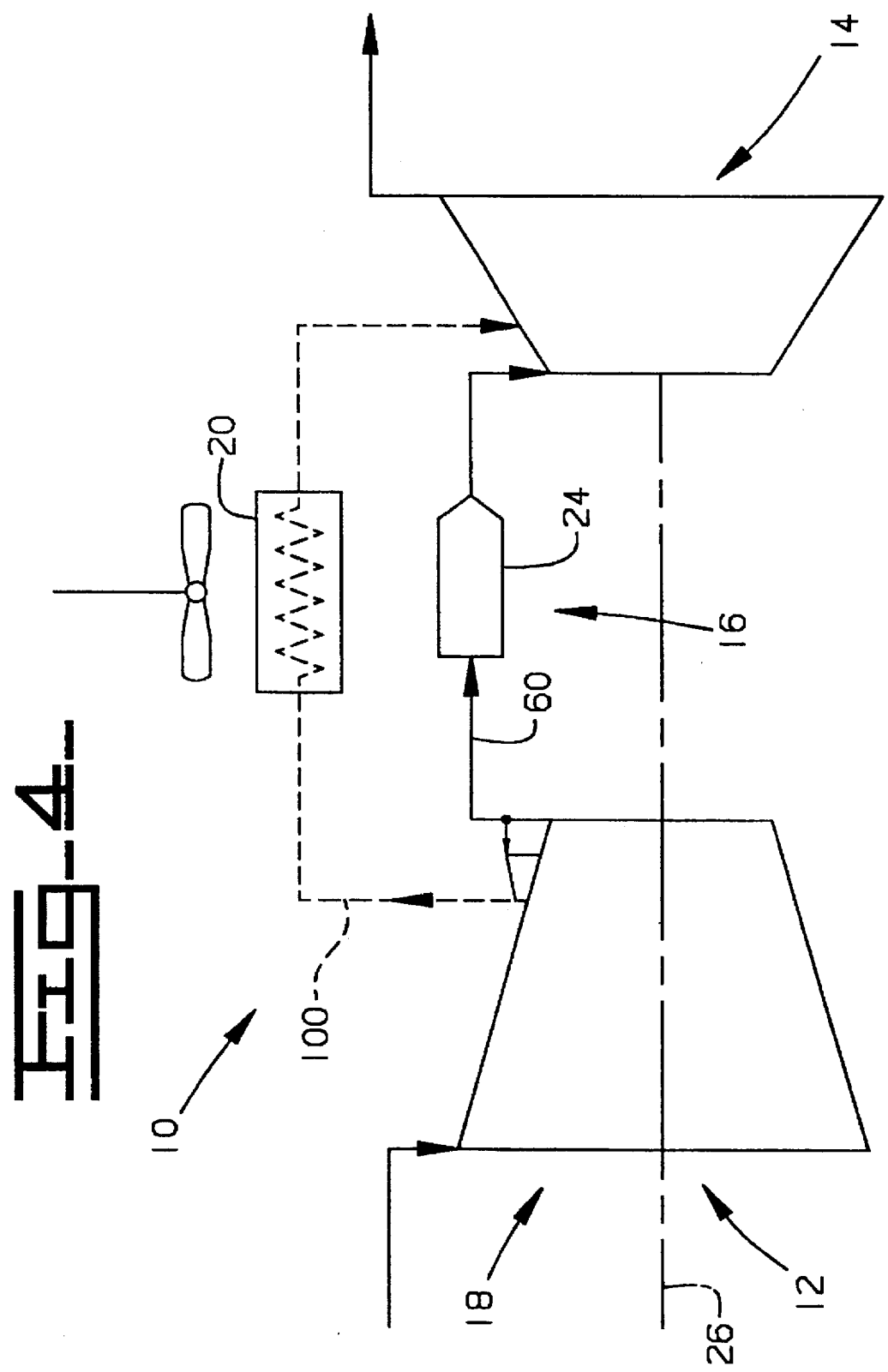
FIG. 4 is a generally schematically displayed side view of a portion of a gas turbine engine including an alternative embodiment of the invention.
Figure 5:
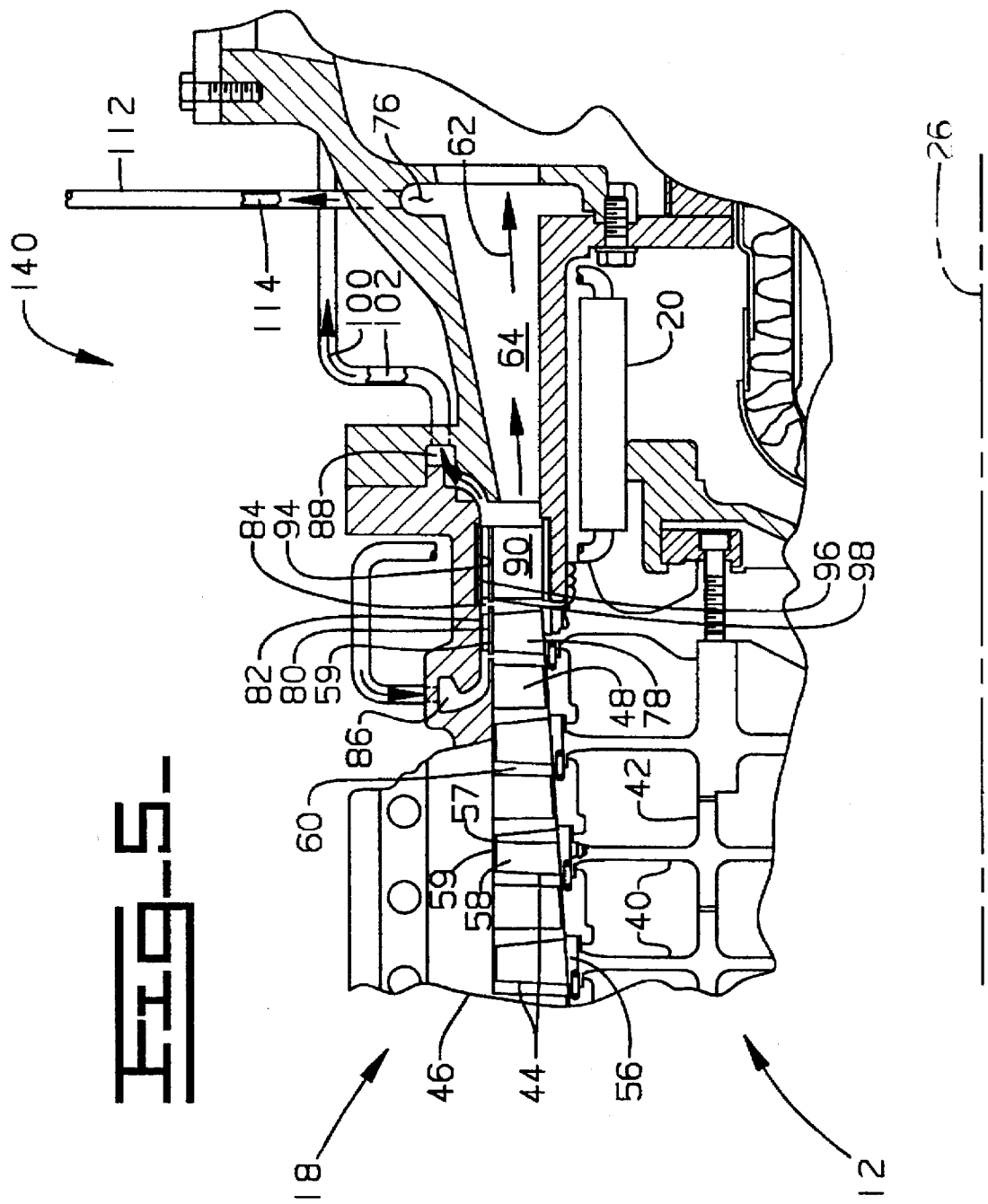
FIG. 5 is an enlarged sectional view of a portion of a gas turbine engine including an alternative embodiment of the invention.

Several alternatives can be used without changing the essence of the invention. For example, the heat exchanger 20 can be of any conventional design, such as air to air, air to liquid, plate fin, tube to fin or primary surface type configuration. Furthermore, as shown in FIG. 5, the heat exchanger 20 can be internally mounted within the engine configuration or, as shown in FIG. 3, externally mounted. The cooling medium can be a liquid, such as water, fuel or a refrigerant, or a gaseous fluid such as air. If fuel or water is used as the cooling medium, the coolant, after passing through the heat exchanger, can be used to fuel the engine or as water or steam injection for reducing emissions, as shown in FIG. 2. Furthermore, as shown in FIG. 1 and alternatively in FIG. 4, the cooling media could include an inert or nonflammable fluid medium defining a closed system 140. As a further alternative, the second fluid flow path 76 could include a plurality of two-story compressor blades 78 and stator blades 90 systematically arranged to provide a fluid flow 100 within the second fluid flow path 76.

The resulting structure reduces the amount of cooling air required to cool engine 10 components since the temperature of the cooling air is reduced and the effective cooling can be accomplished with a less quantity of cooling air. Furthermore, the present structure does not require an external or separate auxiliary or internally driven compressor module. The net result of the structure is a reduced amount of cooling air and an improved engine efficiency.

INDUSTRIAL APPLICABILITY

In operation, the amount of cooling fluid or air from the compressor section 18 used in the second fluid flow path 76 of the air flow delivery system 12 for cooling components of the engine 10 has been reduced. Thus, resulting in an improved efficiency and power of the gas turbine engine 10 while increasing the longevity of the components used within the gas turbine engine 10. The following operation will be directed to the first stage turbine 38; however, the cooling operation of the remainder of the engine components, such as the airfoils (blades and nozzles) could be very similar if cooling is used.

The gas turbine engine 10, during operation, compresses filtered air with the first blade portion 58 at each of the plurality of stages 40 forming the flow of compressed air 62 in the first fluid flow path 64. A portion of the flow of compressed air 62 is drawn from the first fluid flow path 64 and is communicated to the heat exchanger 20 byway of the ducting system 110. Within the heat exchanger 20, heat is extracted from the compressed air 62 and transferred to the cooling medium by way of the fins 132 and the tubes 126. The cooled compressed air 62 exits the heat exchanger 20 and is communicated to the inlet end portion 86 of the gallery 84. The cooled compressed air 62 contacts the second blade portion 82 wherein the velocity thereof is increased forming the flow of cooling air 100 in the second fluid flow path 76 which is used to cool components of the gas turbine engine 10, such as portions of the turbine section 14.

Thus, the primary advantages of the improved turbine cooling system including the air flow delivery system 12 is to provide combustion air and to provide a lower temperature cooling air which will more efficiently be used for the cooling components of the gas turbine engine 10, increasing the component life and resulting is less air for cooling purposes being drawn from the compressor section and increased efficiency of the engine. The air flow delivery system 12 includes the first fluid flow path 64 and the second fluid flow path 76. The second fluid flow path 76 draws cooling air 62 from the first fluid flow path 64, cools the air for more effective cooling use and directs the cooled cooling air 100 to components of the engine 10 to be cooled. Furthermore, the two-story compressor blade 78 having the first blade portion 58 is used to cause the fluid flow 62 within the first fluid flow path 64 and the second blade portion 82 is used to cause the fluid flow 100 within the second fluid flow path 78.

Other aspects, objects and advantages of this invention can be obtained from a study of the drawings, the disclosure and the appended claims.

We claim:

1. An air flow delivery system for providing a combustion fluid and for providing a cooling fluid to cool components of a gas turbine engine having a compressor section, said air flow delivery system comprising:

a first fluid flow path interconnecting the compressor section with the combustor section, said compressor section including a plurality of blades having a first blade portion causing a fluid flow within the first fluid flow path when the compressor section is in operation and at least one of said plurality of blades includes a two-story blade configuration and wherein said two-story blade configuration includes a root portion, a platform portion projecting radial therefrom, the first blade portion extending radial from the platform portion, an outer tip defined on the first blade portion, a ring segment being attached to the outer tip and the second blade portion extending radially from the ring segment; and a second fluid flow path interconnecting the first fluid flow path with the components of the gas turbine engine to be cooled, said second fluid flow path including a heat exchanger interposed the first fluid flow path and the components to be cooled, said second fluid flow path having a flow of cooling air therein being formed by the operation of a second blade portion being formed on the plurality of blades.

2. The air flow delivery system of claim 1 wherein said first fluid flow path includes a passage in which the first blade portion is positioned.

3. The air flow delivery system of claim 2 wherein said second fluid flow path includes a gallery in which the second blade portion is positioned.

4. The air flow delivery system of claim 3 wherein said passage is separated from said gallery.

5. An air flow delivery system for providing a combustion fluid and for providing a cooling fluid to cool components of a gas turbine engine having a compressor section, said air flow delivery system comprising:

a first fluid flow path interconnecting the compressor section with the combustor section, said compressor section including a plurality of blades having a first blade portion causing a fluid flow within the first fluid flow path when the compressor section is in operation; and a second fluid flow path interconnecting the first fluid flow path with the components of the gas turbine engine to be cooled, said second fluid flow path including a heat exchanger interposed the first fluid flow path and the components to be cooled, said heat exchanger is externally mounted from the gas turbine engine, said second fluid flow path having a flow of cooling air therein being formed by the operation of a second blade portion being formed on the plurality of blades.

6. The air flow delivery system of claim 5 wherein said heat exchanger is of the tube fin configuration.

7. The air flow delivery system of claim 1 wherein said heat exchanger is internally mounted within the gas turbine engine.

8. The air flow delivery system of claim 1 wherein said heat exchanger includes a closed system containing an inert or nonflammable fluid.

9. An air flow delivery system for use with a gas turbine engine, said gas turbine engine including a compressor section having a plurality of stages each having a disc in which a plurality of blades are attached thereto, and a combustor section and a turbine section positioned in operative relationship therewith, said air flow delivery system comprising:

a portion of said plurality of blades defining a two-stage configuration including a root portion, a platform portion projecting radial therefrom, the first blade portion extending radial from the platform portion, and outer tip defined on the first blade portion, said first blade portion being spaced from a second blade portion by a ring segment;

a first fluid flow path including a passage in which the first blade portion is positioned, and said first fluid flow path being in fluid flow communication with the turbine section;

a second fluid flow path including a gallery in which the second blade portion is positioned, said gallery being in fluid communication with the first fluid flow path;

a fluid flow being created within the first fluid flow path by the first blade portion during operation of the compressor section, said flow being generally used to provide a flow of fluid to the combustor section;

a flow of cooling fluid being created within the second fluid flow path by the second blade portion during operation of the compressor section, said flow being generally used to provide a flow of cooling fluid to cool components of the gas turbine engine.

10. The air flow delivery system of claim 9 wherein said fluid for creating the flow of cooling fluid is drawn from the fluid flowing within the first fluid flow path.

11. The air flow delivery system of claim 9 wherein said second fluid flow path includes a heat exchanger operative positioned within the flow of cooling fluid.

12. The air flow delivery system of claim 11 wherein said heat exchanger includes a heat exchanging medium, having a gaseous state.

13. The air flow delivery system of claim 11 wherein said heat exchanger includes a heat exchanging medium, having a liquid state.

14. The air flow delivery system of claim 13 wherein said heat exchanging medium is a combustible liquid being use within the combustor section of the gas turbine engine.

15. The air flow delivery system of claim 13 wherein said heat exchanging medium is a liquid being used within the combustor section for reducing emissions emitted from the gas turbine engine.

16. The air flow delivery system of claim 15 wherein said liquid is water.

17. The air flow delivery system of claim 11 wherein said heat exchanger is of the tube to fin configuration.

18. The air flow delivery system of claim 11 wherein said heat exchanger is of the primary surface configuration.

19. The air flow delivery system of claim 18 wherein said primary surface configuration of the heat exchanger uses air as the cooling medium.

20. The air flow delivery system of claim 11 wherein said heat exchanger includes a closed system containing an inert or nonflammable fluid.

21. The air flow delivery system of claim 8 wherein said heat exchanger has a heat exchanging medium having a liquid state.

22. The air flow delivery system of claim 21 wherein said liquid is water.

* * * * *